United States Patent
Ikegami et al.

(10) Patent No.: US 11,250,722 B2
(45) Date of Patent: Feb. 15, 2022

(54) PERFORMANCE TRAINING APPARATUS AND METHOD

(71) Applicant: Yamaha Corporation, Hamamatsu (JP)

(72) Inventors: Toshiya Ikegami, Hamamatsu (JP); Ushin Tei, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 360 days.

(21) Appl. No.: 16/357,897

(22) Filed: Mar. 19, 2019

(65) Prior Publication Data

US 2019/0213903 A1 Jul. 11, 2019

Related U.S. Application Data

(63) Continuation of application No. PCT/JP2017/033922, filed on Sep. 20, 2017.

(30) Foreign Application Priority Data

Sep. 21, 2016 (JP) .............................. JP2016-184059

(51) Int. Cl.
    *G09B 15/00* (2006.01)
    *G09B 5/02* (2006.01)
    (Continued)

(52) U.S. Cl.
    CPC .............. *G09B 15/00* (2013.01); *G09B 5/02* (2013.01); *G09B 5/04* (2013.01); *G10G 1/00* (2013.01); *G10H 1/00* (2013.01); *G09B 5/06* (2013.01)

(58) Field of Classification Search
    CPC . G09B 15/00; G09B 5/02; G09B 5/04; G09B 5/06; G10G 1/00; G10H 1/00
    See application file for complete search history.

(56) References Cited

U.S. PATENT DOCUMENTS 6,072,113 A    6/2000  Tohgi et al.
2003/0167903 A1  9/2003  Funaki
(Continued)

FOREIGN PATENT DOCUMENTS

EP   0837436 A1 *  4/1998  ............ G09B 15/04
JP   58-28794 A    2/1983
(Continued)

OTHER PUBLICATIONS

Tateishi, Naofumi. Play Learning Dvice, JP application No. 06/301,333 A, Oct. 28, 1994, 16 pages. (Year: 1994).*
(Continued)

*Primary Examiner* — James B Hull
(74) *Attorney, Agent, or Firm* — Crowell & Moring LLP

(57) ABSTRACT

For each sound of a model performance, performance information designating a sound generation timing and sound are supplied, and for each of a plurality of phrases into which the model performance is divided, intensity information indicative of an intensity of sound for the phrase is supplied. In accordance with a progression of a performance time and for each phrase of the model performance, the intensity information is acquired ahead of a start timing when a performance of the phrase is to be started, and the intensity of sound common to sounds in the phrase is presented based on the acquired intensity information. The intensity of the sound is presented in a visual or audible manner. In this way, a human player can know, through a visual display and/or an audible sound, an intensity of a key depression operation for each phrase of the model performance before starting the phrase. As a result, the human player can practice the performance while being aware of the intensity of sound for each phrase.

14 Claims, 4 Drawing Sheets

(51) Int. Cl.
*G10G 1/00* (2006.01)
*G09B 5/04* (2006.01)
*G10H 1/00* (2006.01)
*G09B 5/06* (2006.01)

(56) References Cited

U.S. PATENT DOCUMENTS

2006/0219091 A1 10/2006 Ohmura et al.
2014/0033903 A1 2/2014 Araki et al.

FOREIGN PATENT DOCUMENTS

| JP | 60-177396 | A | | 9/1985 | |
|----|-----------|---|---|--------|---|
| JP | 5-100678 | A | | 4/1993 | |
| JP | 6-301333 | A | | 10/1994 | |
| JP | 06301333 | A | * | 10/1994 | |
| JP | 10-187022 | A | | 7/1998 | |
| JP | 2003-330454 | A | | 11/2003 | |
| JP | 2006-276333 | A | | 10/2006 | |
| JP | 2006276333 | A | * | 10/2006 | ............ G10H 1/344 |
| WO | WO 2013/111293 | A1 | | 8/2013 | |

OTHER PUBLICATIONS

Omura, Hiroko and Suzuki, Daisuke., Electric Musical Instrument and Velocity Display Program, JP application No. 20060219091, Oct. 12, 2006, 16 pages. (Year: 2006).*

International Preliminary Report on Patentability (PCT/IB/338 & PCT/IB/373) issued in PCT Application No. PCT/JP2017/033922 dated Apr. 4, 2019, including English translation of document C2 (Japanese-language Written Opinion (PCT/ISA/237) previously filed on Mar. 19, 2019) (seven (7) pages).

Japanese-language Office Action issued in counterpart Japanese Application No. 2016-184059 dated Nov. 26, 2019 with English translation (five (5) pages).

International Search Report (PCT/ISA/210) issued in PCT Application No. PCT/JP2017/033922 dated Dec. 19, 2017 with English translation (five (5) pages).

Japanese-language Written Opinion (PCT/ISA/237) issued in PCT Application No. PCT/JP2017/033922 dated Dec. 19, 2017 (four (4) pages).

* cited by examiner

| TARGET LEVEL | DISPLAY |
|---|---|
| STRONG | > > > > > > > > |
| MEDIUM | > > > > |
| WEAK | > |

FIG. 2

| DETECTION LEVEL | DISPLAY |
|---|---|
| STRONG | ■ ■ ■ ■ ■ ■ ■ ■ |
| MEDIUM | ■ ■ ■ ■ |
| WEAK | ■ |

FIG. 3

| COMPARISON RESULT | DISPLAY |
|---|---|
| STRONG | ■ < < < ■ |
| RIGHT | ■ ■ ■ ■ |
| WEAK | ■ > > ■ |

FIG. 4

PERFORMANCE TRAINING APPARATUS AND METHOD

PRIORITY

This application is based on, and claims priority to, JP PA 2016-184059 filed on 21 Sep. 2016 and International Patent Application No. PCT/JP2017/033922 filed on 20 Sep. 2017. The disclosure of the priority applications, in its entirety, including the drawings, claims, and the specification thereof, are incorporated herein by reference.

BACKGROUND

The embodiments of the present invention generally relate to apparatus and methods for training (or assisting) a user or human player in a music performance, and more particularly relate to a performance training apparatus, performance training program, and performance training method for efficiently training a user or human player how to impart intensity variation to sounds in a music performance.

An existing performance display apparatus visually displays circular pictures or graphics corresponding to velocities (intensities of sounds) of sound generation events of a reference or model performance and circular pictures or graphics corresponding to velocities (intensities of sounds, namely, intensities of performance operations) of a user's performance. With such a performance display apparatus, it is possible to identify a difference in intensity of each user's performance operation from a corresponding portion of the model performance by, after the user's performance, comparing/visually checking the circular graphics based on the user's performance against the circular graphics of the model performance.

SUMMARY

However, with the performance display apparatus described above, it is not possible for the user to appropriately know (or imagine), before executing each performance operation, an intensity of the performance operation to be executed (namely, intensity of a sound to be performed).

In view of the foregoing prior art problems, it is one of the objects of the present invention to provide a performance training apparatus which enables a user or human player to appropriately know, before executing a performance operation, an intensity of the performance operation to be executed (namely, am intensity of a sound to be performed) and thereby enables the human player to practice a performance while being aware of the intensity of each performance operation to be executed.

In order to accomplish the aforementioned and other objects, the inventive performance training apparatus includes: a database that, for each sound of a model performance, supplies performance information designating a sound generation timing and sound, and supplies, for each of a plurality of phrases into which the model performance is divided, intensity information indicative of an intensity of sound for the phrase; an output device; a storage medium storing a program; and a processor for executing the program, the processor, when executing the program, configured to: progress a performance time; and in accordance with a progression of the performance time and for each phrase of the model performance, acquire the intensity information ahead of a start timing when a performance of the phrase is to be started and presents the intensity of sound common to sounds in the phrase based on the acquired intensity information via the output device.

According to the inventive performance training apparatus, the intensity information indicative of an intensity of sound for each phrase of the model performance is acquired ahead of the start timing when the performance of the phrase is to be started, and the intensity of sound common to sounds in the phrase is presented based on the acquired intensity information. Thus, a human player (namely, the user to be trained or user who receives the training) can know the intensity of sounds in the phrase, for which a performance operation is to be executed by the human player, before a start timing of the phrase. In this way, the human player can appropriately execute his or her own performance operation for each phrase while being aware of (or while having in mind) the intensity of the performance for the phrase of the model performance. As a result, the human player can appropriately do a performance practice with an awareness of the intensity of sound for each phrase.

The disclosure made herein also embraces a performance training method that includes steps corresponding to the constituent elements of the inventive performance training apparatus set forth above. Also disclosed herein is a computer-readable, non-transitory storage medium storing a group of instructions executable by one or more processors for performing the performance training method.

BRIEF DESCRIPTION OF DRAWINGS

Certain embodiments of the present invention will hereinafter be described in detail, by way of example only, with reference to the accompanying drawings, in which:

FIG. 2 is a diagram explanatory of target levels and level indicating graphics;

FIG. 3 is a diagram explanatory of detected levels and level indicating graphics;

FIG. 4 is a diagram explanatory of comparison results and result indicating graphics;

DETAILED DESCRIPTION

Construction of Electronic Keyboard Musical Instrument

Figure 1:
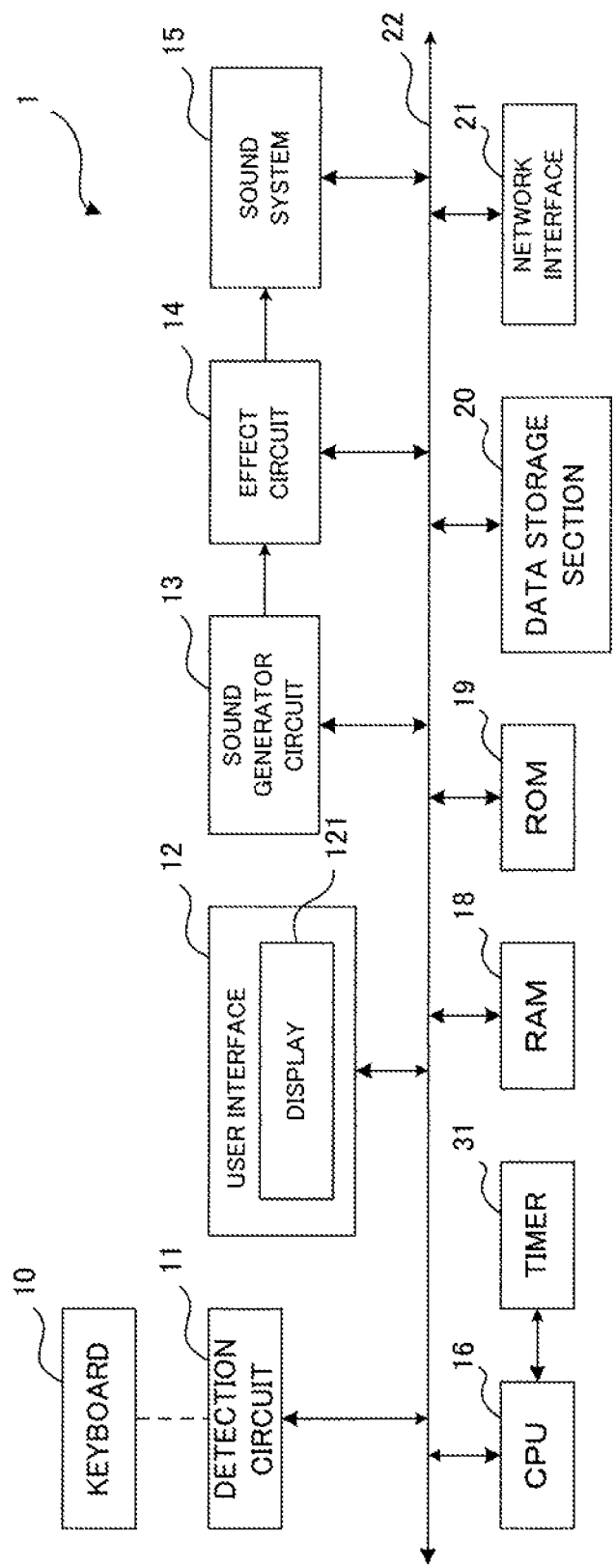
FIG. 1 is a block diagram illustrating an electrical construction of an electronic keyboard musical instrument embodying an inventive performance training apparatus.

An electrical construction of an electronic keyboard musical instrument 1 will be described with reference to FIG. 1. The electronic keyboard musical instrument 1 has not only a function for generating a performance sound in response to a human player operating a keyboard but also a lesson function (namely, a performance training function), and the like. The electronic keyboard musical instrument 1 has an embodiment of an inventive performance training apparatus incorporated therein.

The electronic keyboard musical instrument 1 includes, among others, a keyboard 10, a detection circuit 11, a user interface 12, a sound generator circuit 13, an effect circuit 14, a sound system 15, a CPU 16, a timer 31, a RAM 18, a ROM 19, a data storage section 20, and a network interface 21. The CPU 16 controls various components of the electronic keyboard musical instrument 1 by executing various programs stored in the ROM 19. Here, the "various components" are the detection circuit 11, user interface 12, sound generator circuit 13, network interface 21, etc. that are connected to the CPU 16 via a bus 22. The RAM 18 is used as a main storage device to be used by the CPU 16 to perform various processes. The data storage section 20 stores, among others, music piece data of a MIDI (Musical Instrument Digital Interface (registered trademark)) format. The data storage section 20 is implemented, for example, by a non-transitory storage medium, such as a flash memory. The timer 31, which counts a time remaining before arrival at a given set time, outputs a signal to the CPU 16 once the remaining time becomes zero.

The keyboard 10 includes pluralities of white keys and black keys corresponding to various pitches (sound pitches). The detection circuit 11 generates a performance detection signal by detecting a performance operation executed on the keyboard 10 and transmits the generated performance detection signal to the CPU 16. On the basis of the performance detection signal received from the detection circuit 11, the CPU 16 generates performance data of the MIDI format.

The sound generator circuit 13 performs signal processing on data of the MIDI format so as to output a digital audio signal. The effect circuit 14 imparts an effect, such as a reverberation, to the audio signal output from the sound generator circuit 13 to thereby output an effect-imparted digital audio signal. The sound system 15 includes, among others, a digital-to-analog converter, an amplifier, and a speaker that are not shown in the drawings. The digital-to-analog converter converts the digital audio signal output from the effect circuit 14 to an analog audio signal and outputs the converted analog audio signal to the amplifier. The amplifier amplifies the analog audio signal and outputs the amplified analog audio signal to the speaker. The speaker sounds or audibly generates a sound corresponding to the analog audio signal input from the amplifier. In this manner, the electronic keyboard musical instrument 1 audibly generates a performance sound in response to a user's or human player's operation on the keyboard 10. The electronic keyboard musical instrument 1 also audibly generates an automatic performance sound on the basis of music piece data stored in the data storage section 20. In the following description, audibly generating an automatic performance sound is sometimes referred to simply as reproducing or reproduction. Note that one of functions of the data storage section 20 is a database for supplying the music piece data. Also, the RAM 18 and/or the ROM 19 can function as such a database for supplying the music piece data. A group of the data storage section 20, RAM 18 and/or the ROM 19 functions as a local memory for supplying (or storing) the music piece data.

The user interface 12 includes a display (such as a liquid crystal display) 121 and a plurality of operating buttons, such as a power button and a "start/stop" button or key, which are not shown in the drawings. The user interface 12 displays various setting screens etc. on the display 121 in accordance with instructions given by the CPU 16. Further, the user interface 12 transmits to the CPU 16 a signal representative of an operation received via any one of the operating buttons. The network interface 21 executes LAN communication. The CPU 16 is connectable to the Internet via the network interface 21 and a not-shown router so as to download desired music piece data from a content server or a cloud service computing system that is connected to the Internet so as to supply music piece data via the Internet. Such a content server or a cloud service computing system also functions as a database for supplying the music piece data.

Note that the user interface 12 is located in a rear portion of the keyboard 10 as viewed from the human player operating the keyboard 10. Thus, the human player can execute a music performance while viewing displays shown on the display 121.

Outline of Lesson Function

Next, a description will be given of the lesson function (namely, a primary function as the performance training apparatus) of the electronic keyboard musical instrument 1. Although the electronic keyboard musical instrument 1 has a plurality of types of lesson functions, the following description will mainly describe the primary lesson function (intensity lesson function) which gives the human player (user) a lesson about intensities of operating force with which to depress various keys of the keyboard 10. Note that such an "intensity" of operating force with which to depress a keyboard key can also be referred to as a "velocity" at which to depress the key. When a loud sound is to be generated, the human player depresses a key of the keyboard 10 strongly or with a strong intensity. The detection circuit 11 detects a velocity at which a key of the keyboard 10 is depressed and outputs a signal indicative of the detected velocity as "velocity" data (namely, data indicative of an intensity of a sound). It is known that the more strongly the human player depresses a key of the keyboard 10, the higher becomes the velocity at which the key is depressed. Namely, the more strongly the human player depresses the key, the greater becomes the value of the "velocity", and hence the greater becomes the volume of a performance sound generated by the sound system 15. Note that a lesson function (key depression guide function) to provide display for visually guiding the human player about each key to be depressed by the human player is conventionally known. The following paragraphs describe an example in which is executed a training program composed of a combination of an intensity lesson function according to an implementation of the present invention and the conventionally known key depression guide function.

Note that if the human player depresses a key different from a key of the reference or model performance, a sound of a pitch different from a pitch of the key of the model performance is generated, and thus, the human player can easily notice that he or she has depressed the wrong key. Particularly, if the human player is a beginner player, it is difficult for the human player to determine whether an intensity with which the player is depressing a key of the keyboard 10 is greater or smaller (stronger or weaker) than, or about the same as, an intensity specified in the model performance. Thus, the intensity lesson function employed in the present embodiment is specifically designed to enable the human player to depress a key of the keyboard 10 appropriately with any one of three different intensity levels. Namely, according to the intensity lesson function in the present embodiment, intensity levels of sounds are limited to, or classified into, three stages so as to enable the human player to easily identify differences among the intensity levels.

The following briefly describe an outline of a structure of training music piece data (training music piece data set) according to an implementation of the present invention. Music piece data for the intensity lesson function is composed of a plurality of phrases, and each phrase includes a plurality of sounds. Specifically, the training program is programmed such that, for each of the plurality of phrases for the intensity lesson function, one or more keys corresponding to the plurality of sounds each having the same intensity level is depressed plural times in the single phrase.

Namely, although the plurality of sounds for which the one or more keys is to be depressed in the single phrase may have the same pitch or suitably different pitches, the same intensity level is to be instructed for these sounds in the single phrase. Thus, because the human player repeats plural times of key depression with the same intensity in the single phrase, he/she can easily approach his/her key depression intensity to the targeted intensity level. To practice the intensity lesson on a phrase-by-phrase basis where each phrase is composed of a plurality of sounds improves efficiency of the lesson and brings advantages, accordingly. In the intensity lesson, first, an intensity (i.e., any one of the three stages of levels) of a sound in a particular phrase for which a performance operation is to be executed by the user is presented to the user visually and/or audibly prior to a timing to start the performance of the particular phrase. In the audible presentation, for example, an intensity with which to depress a key is aurally presented to the human player by a sound of volume corresponding to an intensity of a sound to be performed in the particular phrase being audibly generated. Further, through the key depression guide function executed concurrently or parallel with the intensity lesson function, a guide display is executed for guiding the human player about a key to be operated, and a timing (sound generation timing) at which the key is to be depressed is visually informed to the human player. Once the human player depresses the key instructed by the key depression function with the intensity presented by the intensity lesson function, the intensity (any one of the three-stage levels) with which the human player has depressed the key is displayed on the display 121. Then, a result of comparison between the intensity with which the human player has depressed the key and the intensity instructed in the model performance (model intensity) is displayed on the display 121 to indicate whether the intensity of the user's performance operation is strong or weak relative to the model intensity.

In the following description, each sound audibly generated by the electronic keyboard musical instrument 1 for audibly presenting an intensity (loudness) of the sound ahead of the sound generation timing of the sound in order to cause the human player (user) to imagine the intensity (loudness) of the sound in accordance with the intension lesson function will be referred to as "presented sound", and a display executed by the electronic keyboard musical instrument 1 for visually presenting the intensity of the sound ahead of the sound generation timing will be referred to as "presented level display". Further, guide-displaying a key to be depressed near a predetermined sound generation timing (key operation timing) in accordance with the key depression guide function will be referred to as "pitch guide display". Furthermore, an intensity level shown on the presented level display will be referred to as "target level", and an intensity level with which the human player has depressed a key will be referred to as "detected level".

Display Screen

Next, a description will be given of a display screen shown on the display 121 during execution of the lesson function. A schematic plan view of the keyboard 10 (hereinafter referred to as "keyboard view") and an intensity indicator is displayed on the display screen. The pitch guide display is implemented by a pitch to be performed being clearly indicated on the keyboard view. The intensity indicator is an indicator that displays an intensity level etc., and the presented level display is implemented by use of such an intensity indicator. Details of the intensity indicator will be set forth below. Furthermore, a state where the pitch guide display is being executed on the keyboard view will be referred to as "ON state", whereas a state where the pitch guide display is not being executed on the keyboard view will be referred to as "OFF state". Similarly, a state where the presented level display is being executed on the intensity indicator will be referred to as "ON state", whereas a state where the presented level display is not being executed on the intensity indicator will be referred to as "OFF state".

Intensity Indicator

Next, with reference to FIGS. 2 to 4, a description will be given of several types of the intensity indicator employed in the present embodiment. In the presented level display, as illustrated in FIG. 2, the target level (namely, intensity of a sound in the model performance) is indicated by the number of ">" marks (hereinafter referred to as "angle bracket marks"). More specifically, the electronic keyboard musical instrument 1 displays a strong level by a level indicating graphic formed of eight angle bracket marks, a medium level by a level indicating graphic formed of four angle bracket marks, and a weak level by a level indicating graphic formed of one angle bracket mark. In the display of an intensity with which the human player has depressed a key, as illustrated in FIG. 3, the detected level (namely, detected intensity level of a sound performed by the user) is indicated by the number of black rectangular marks. More specifically, the electronic keyboard musical instrument 1 displays a strong detected level by a level indicating graphic formed of eight black rectangular marks, a medium detected level by a level indicating graphic formed of four black rectangular marks, and a weak detected level by a level indicating graphic formed of one black rectangular mark. A result of comparison between the intensity of a sound in the model performance and the intensity of a sound in the user's performance (namely, information indicative of a difference between the intensities of the two sounds) is displayed in a manner as illustrated in FIG. 4. In a case where the detected level is strong relative to the target level, the electronic keyboard musical instrument 1 displays a level indicating graphic indicative of "strong" that is formed of a combination of left-pointing angle bracket marks and black rectangular marks. In a case where the detected level is within a predetermined range of the target level, the electronic keyboard musical instrument 1 displays a level indicating graphic indicative of "right" that is formed of black rectangular marks alone. Further, in a case where the detected level is weak relative to the target level, the electronic keyboard musical instrument 1 displays a level indicating graphic indicative of "weak" that is formed of a combination of right-pointing angle bracket marks and black rectangular marks.

Music Piece Data

Next, a description will be given of music piece data (music piece data set) used in the present embodiment. The music piece data used in the present embodiment is data optimized for a music performance lesson and thus is different from ordinary music piece data. The music piece data used in the present embodiment is composed of the intro section and the practicing section. In the practicing section, music piece data as the model performance is divided into a plurality of phrases. Further, in the practicing section, appropriate time periods are set for sequentially indicating keys that are to be sequentially depressed by the human player (users) for a music piece performance. Namely, the practicing section is constructed in such a manner that a pitch guide display is executed for prompting the human player to depress a key, then a given time period is set for the user to depress the key, then a next pitch guide display is executed, and so on.

The music piece data (or music piece data set) includes music piece information (header information) and a group of event information recorded on a plurality of tracks. The music piece information (header information) includes information other than the event information, such as a music piece name of the music piece data. On each of the tracks, pairs of data, each constituted by time information and an event, are arranged in accordance with progression sequences of an automatic performance and of various displays that relate to the music piece. The event is data indicative of content of processing, and the time information is data indicative of a processing time. Lesson data are recorded on one or more of the plurality of tracks, and accompaniment data are recorded on the other tracks. Examples of the event include, among others, "note-on" and "note-off" that are MIDI events, and "keyboard-display-on", "keyboard-display-off", "intensity-display-on" and "intensity-display-off" that are meta events. Note that the "keyboard-display-on", "keyboard-display-off", "intensity-display-on", and "intensity-display-off" are recorded on the lesson track or tracks. "note-on" events each for starting generation of a presented sound and "note-off" events each for silencing or deadening a presented sound are also recorded on the lesson track(s).

As well known in the art, the "note-on" event is an event that instructs the start of generation of a sound (note), whereas the "note-off" event is an event that instruct deadening of a currently generated sound (note). A "note number", "velocity", etc. are attached to the "note-on" and "note-off" events. The "note number" is data designating a pitch, and the "velocity" is data indicative of an intensity of a sound. However, the following description will focus mainly on the "note-on" or "note-off" event for starting generation of or deadening a presented sound according to an implementation of the present invention. It should be noted that the presented sound to be generated or deadened on the basis of such a "note-on" or "note-off" event does not necessarily have to have a pitch designated by a "note number", as described later. As an example, the data of the "note number" attached to the "note-on" or "note-off" event for starting generation of or deadening the presented sound is constituted by information designating a particular sound that corresponds to any one of a plurality of (for example, three) stages of intensity levels of presented sounds that are used for audibly presenting the plurality of stages of intensity levels, and the data of the "velocity" attached to the note-on or note-off event is constituted by information designating volume (sound volume) at which the particular sound is to be generated. As an example, particular sounds corresponding to the individual stages of intensity levels are sounds having particular sound colors (timbres) and pitches (temporally varying pitches), such as a "cry of a dog", "cry of a cat", and "cry of a bird", as set forth below. In this case, because the intensity level of the sound audibly presented by the presented sound is identifiable by the corresponding particular sound, the value of the "velocity" attached to the "note-on" event does not necessarily have to correspond to the intensity level of the sound to be presented by the presented sound and may be a desired value. However, the present embodiment is not so limited, and as a modification, sounds having a same sound color and/or same pitch may be used as the particular sounds corresponding to the individual stages of intensity levels of the presented sounds. In such a case, the value of the velocity attached to the "note-on" event may be set at a value corresponding to the intensity level of the sound to be presented by the presented sound so that the sound intensity level is audibly presented by the volume at which the presented sound is generated.

The "keyboard-display-on" and "keyboard-display-off" events are data for the pitch guide display. "note number", time information, etc. are attached to the "keyboard-display-on" and "keyboard-display-off" events. The "note number" attached to the "keyboard-display-on" and "keyboard-display-off" events designates a pitch of a sound in the lesson music piece, and the time information corresponding to the "keyboard-display-on" and "keyboard-display-off" events designates a sound generation timing of a sound in the lesson music piece. Thus, the "keyboard-display-on" and "keyboard-display-off" events and the time information corresponding thereto correspond to performance information that designates a sound generation timing and sound for each sound of the model performance.

The "intensity-display-on" and "intensity-display-off" events are data for executing the presented level display. Corresponding time information, "velocity" data, etc. are attached to the "intensity-display-on" and "intensity-display-off" events. In an embodiment, there are two types of the "intensity-display-on" and "intensity-display-off" events for executing the presented level display. One of the two types is a type in which the presented level display is carried out prior to the start of the corresponding phrase (hereinafter referred to as a "first type"), and another one is a type in which the presented level display is carried out in parallel to the start of the corresponding phrase (hereinafter referred to as a "second type"). The "intensity-display-on" and "intensity-display-off" events for executing the first type of the presented level display are in corresponding relationship with the aforementioned presented sound "note-on" and "note-off" events, respectively. The "intensity-display-on" and "intensity-display-off" events are used to visually present a common intensity of the sounds for each phrase in the model performance prior to the individual phrase in the model performance, and the "note-on" and "note-off" events are used to audibly present the common intensity of the sounds for each phrase in the model performance. Thus, for a same phrase in the model performance, the time information corresponding to the "intensity-display-on" event for displaying the presented level and the time information corresponding to the "note-on" event for generating the presented sound each indicates a same timing in such a manner that the intensity of the same sound is presented visually and audibly at the same timing prior to the timing to start the performance of the same phrase. Needless to say, as for the same phrase, the "velocity" data attached to the "intensity-display-on" for displaying the presented level indicates the same intensity level as the intensity level (namely, any one of the plurality of stages of intensity levels) of the sound represented by the corresponding "note-on" event for generating the presented sound. The time information corresponding to the "intensity-display-on" event for performing the first type of the presented level display and the time information corresponding to the "note-on" event for generating the presented sound (such events are designed to visually and audibly present the intensity of each phrase in the model performance) are set to precede, by a predetermined preceding time (such as a time corresponding to one beat at a normal performance tempo), a start time point of the corresponding phrase. Thus, ahead of each timing to start the performance of each phrase in the model performance, the intensity information (namely, the first type of "intensity-display-on" event and the "note-on" for generating the presented sound) can be acquired, so that the intensity of the sound (namely, an intensity of a key depression operation) in the corresponding phrase can be presented to the human player prior to the key depression operation to be executed for the corresponding phrase. Note that an end code is recorded at the end of each of the tracks.

Note that typical "velocity" data according to the conventionally known MIDI standard has a value in the range of 0 to 127. As noted above, the lesson function employed in the present embodiment is designed to enable the human player to depress a key of the keyboard 10 with any one of the three different intensity levels. For this purpose, it suffices that, in the music piece data and the lesson function, velocity values be classified in association with the three stages of intensity levels, "strong", "medium", and "weak". As an example, a velocity value range of 1 to 42 is allocated or classified as the weak level, a velocity value range of 43 to 84 is classified as the medium level, and a velocity value range of 85 to 127 is classified as the strong level. Further, it suffices that only three-stage values be used as the values of the "velocity" data included in the individual events recorded on the lesson track(s), namely, "22" as a value indicative of the weak level, "64" as a value indicative of the medium level, and "106" as a value indicative of the strong level. In other words, it suffices that the "velocity" data attached to each of the "intensity-display-on" events be indicative of any one of the above-mentioned three-stage values.

Functional Blocks

Figure 5:
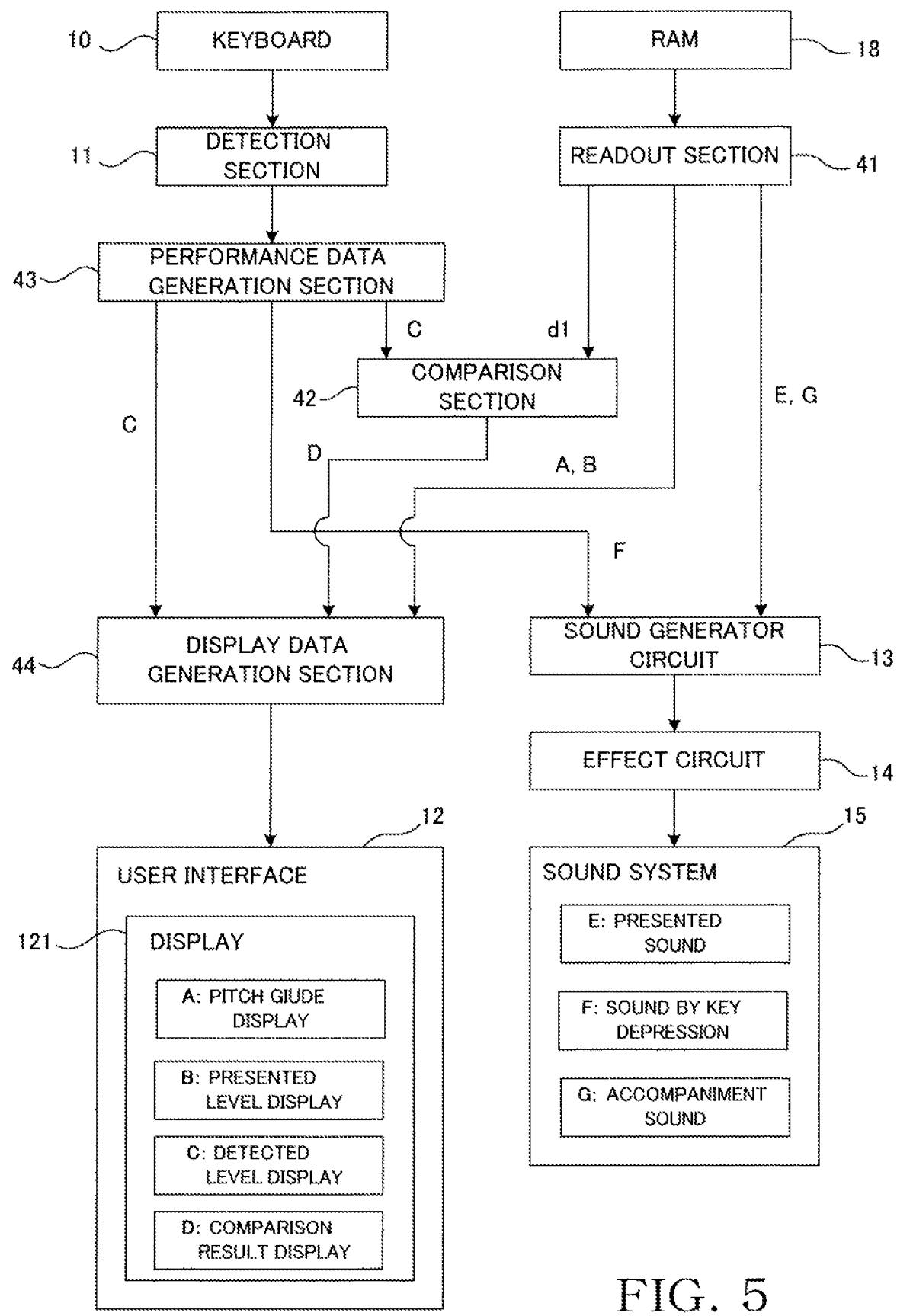
FIG. 5 is a functional block diagram of the electronic keyboard musical instrument embodying the inventive performance training apparatus.

Next, a description will be given of a plurality of functions that can be implemented by the electronic keyboard musical instrument 1, with reference to a functional block diagram of FIG. 5. The electronic keyboard musical instrument 1 is constructed or configured to implement functions of a readout section 41, a comparison section 42, a performance data generation section 43, and a display data generation section 44, in addition to the aforementioned functions. Such readout section 41, comparison section 42, performance data generation section 43, and display data generation section 44 are implemented, for example, by a processor (namely, the CPU 16 of FIG. 1) executing a processing program (tasks) that relates to an inventive performance training method and that is stored in the data storage section 20 in a non-transitory manner. In this case, the readout section 41, comparison section 42, performance data generation section 43, and display data generation section 44 are constituted by program modules (task modules) programmed so as to implement their respective functions.

Once the human player who wants to use the lesson function selects or designates desired music piece data (namely, a desired music piece data set) by operating the user interface 12, the CPU 16 reads out the designated music piece data and stores the read-out music piece data into the RAM 18. If the human player wants to start the lesson function, the player depresses the "start/stop" key of the user interface 12.

Upon determination, based on a signal from the user interface 12, that the "start/stop" key has been depressed, the readout section 41 sequentially reads out the time information and events, included in the individual tracks of the music piece data stored in the RAM 18, from the beginning of the music piece data and outputs, to the comparison section 42, display data generation section 44 and sound generator circuit 13, an instruction specified by each of the events at a timing based on the corresponding time information by use of the timer 31. In this manner, the performance time is progressed; the readout section 41 corresponds to a means or section that progresses the performance time.

If an event to be currently processed as the performance time progresses is a "note-on" or "note-off" event for a presented sound (namely, presented-sound "note-on" or "note-off" event), the readout section 41 not only supplies an instruction (message) E of "note-on" or "note-off" to the sound generator circuit 13 but also supplies "velocity" data d1 attached to the "note-on" event to the comparison section 42. If the supplied instruction E of "note-on" or "note-off" instructs "note-on" (start of sound generation), the sound generator circuit 13 generates a sound signal of a particular sound, corresponding to any one of the three stages of presented sounds, in accordance with the "note number" data included in the instruction E of "note-on" and imparts, to the generated sound signal, volume corresponding to the "velocity" data included in the instruction E of "note-on". The sound signal generated by the sound generator circuit 13 is supplied to the sound system 15 via the effect circuit 14. Thus, the presented sound corresponding to the instruction E of "note-on" is audibly generated or sounded from the sound system 15. If the supplied instruction E of "note-on" or "note-off" instructs "note-on" (start of sound generation), the sound generator circuit 13 instructs "note-off" (sound deadening), the sound generator circuit 13 ends the generation of the sound signal of the currently generated presented sound, indicated by the "note number" included in the instruction E of "note-off", to thereby deaden the presented sound.

If an event to be currently processed as the performance time progresses is a "note-on" or "note-off" event of an accompaniment sound, the readout section 41 supplies an instruction (message) G of "note-on" or "note-off" of the accompaniment sound to the sound generator circuit 13. The sound generator circuit 13 generates an accompaniment sound signal or ends generation of the accompaniment sound in accordance with the instruction (message) G of "note-on" or "note-off" of the accompaniment sound. The accompaniment sound signal generated by the sound generator circuit 13 is supplied to the sound system 15 via the effect circuit 14. Thus, the accompaniment sound corresponding to the instruction G of "note-on" and "note-off" is audibly generated or sounded from the sound system 15. Note that the value of the velocity data attached to the instruction G of "note-on" for the accompaniment sound is set in such a manner that respective volumes of the accompaniment sounds to be generated in the same phrase are adjusted to a level same as the intensity level of the model performance sound for the phrase.

Further, if an event to be currently processed as the performance time progresses is any one of "intensity-display-on", "intensity-display-off", "keyboard-display-on" and "keyboard-display-off" events, the readout section 41 supplies to the display data generation section 44 an instruction B of "intensity-display-on" or "intensity-display-off" or an instruction A of "keyboard-display-on" or "keyboard-display-off". Once the instruction A of "keyboard-display-on" is supplied, the display data generation section 44 creates display data for turning on (placing) the pitch guide display (in the ON state) and outputs the created display data to the user interface 12. Once the instruction A of "keyboard-display-off" is supplied, the display data generation section 44 creates display data for turning off (placing) the pitch guide display (in the OFF state) and outputs the created display data to the user interface 12. In this manner, the pitch guide display is executed on the display 121.

Further, once the instruction B of "intensity-display-on" is supplied, the display data generation section 44 creates display data for turning on (placing) the presented level display (in the ON state) and outputs the created display data to the user interface 12. Furthermore, once the instruction B of "intensity-display-off" is supplied, the display data generation section 44 creates display data for turning off (placing) the presented level display (in the OFF state) and outputs the created display data to the user interface 12. More specifically, if the value of the "velocity" attached to the instruction B of "intensity-display-on" is "22", the display data generation section 44 creates display data including a level indicating graphic for presenting the weak level (weak-level indicating graphic). If the value of the "velocity" is "64", the display data generation section 44 creates display data including a level indicating graphic for presenting the medium level (medium-level indicating graphic). Further, if the value of the "velocity" is "106", the display data generation section 44 creates display data including a level indicating graphic for presenting the strong level (strong-level indicating graphic). In this manner, the presented level display is executed on the display 121.

The performance data generation section 43 creates performance data on the basis of a performance detection signal (signal indicative of a performance operation executed by the user) output from the detection circuit 11 and outputs the thus-created performance data to the comparison section 42, sound generator circuit 13, and display data generation section 44. The performance data is data composed of events and the like. As in the aforementioned music piece data, examples of the events include, among others, "note-on" and "note-off" events, and "note number", "velocity", and the like are attached to the "note-on" and "note-off" events. In this case, the "note number" indicates a pitch of a key depressed or released by the user, and the "velocity" indicates an intensity of the user's key depression operation (namely, intensity of a sound). The performance data output from the performance data generation section 43 is user's performance information that is indicative of the sound performed by the user and that includes information (velocity data) indicative of the intensity of the user's performance operation (namely, intensity of the sound). Thus, the performance data generation section 43 corresponds to a means or section that, in response to a performance operation executed by the user as the performance time progresses, acquires user's performance information indicative of a sound performed by the user. The performance data F output from the performance data generation section 43 is supplied to the sound generator circuit 13 in such a manner that a sound signal having the pitch corresponding to the performance data F ("note-on" or "note-off" event) is generated by the sound generator circuit 13. The sound signal generated by the sound generator circuit 13 is supplied to the sound system 15 via the effect circuit 14 in such a manner that a user performance sound is generated from the sound system 15.

The display data generation section 44 receives "velocity" data C included in the performance data output from the performance data generation section 43, generates, on the basis of a value of the "velocity", display data for displaying a detected level on the intensity indicator, and outputs the thus-generated display data to the user interface 12. More specifically, the display data generation section 44 generates display data for displaying a weak level indicating graphic if the "velocity" value is in the range of "1" to "42", display data for displaying a medium-level indicating graphic if the "velocity" value is in the range of "43" to "84", and display data for displaying a strong-level level indicating graphic if the "velocity" value is in the range of "85" to "127". In this manner, the detected level C is displayed on the display 121.

The comparison section 42 compares the "velocity" data C included in the performance data output from the performance data generation section 43 with the "velocity" data d1 of the music piece data output from the readout section 41 and outputs a result of the comparison, namely, a comparison result D, to the display data generation section 44. On the basis of the comparison result D input from the comparison section 42, the display data generation section 44 generates display data for displaying the comparison result D and outputs the thus-generated display data to the user interface 12. More specifically, the comparison section 42 determines which one of the three-stage levels (namely, weak level, medium level, and strong level) the value of the "velocity" data C included in the performance data belongs to. The value of the "velocity" data C is determined as belonging to the weak level if the value is in the range of "1" to "42", determined as belonging to the medium level if the value is in the range of "43" to "84", and determined as belonging to the strong level if the value of the "velocity" data C is in the range of "85" to "127". Then, the comparison section 42 determines whether or not the determined velocity" data of the performance data is of the same level as the level indicated by the "velocity" data d1 of the music piece data. The "velocity" data d1 of the music piece data is of the weak level if the value of the "velocity" data d1 is "22", is of the medium level if the value of the "velocity" data d1 is "64", and is of the strong level if the value of the "velocity" data d1 is "106", as noted above. If it is determined that the level of the velocity" data of the performance data is of the same as the level of the "velocity" data d1 of the music piece data, the comparison section 42 outputs to the display data generation section 44 a comparison result D indicating "right". If it is determined that the level of the velocity" data of the performance data is not of the same as the level of the "velocity" data d1 of the music piece data, on the other hand, the comparison section 42 further determines whether or not the level of the velocity" data of the performance data is greater than the level of the "velocity" data d1 of the music piece data. If it is determined that the level of the "velocity" data of the performance data is greater than the level of the "velocity" data d1 of the music piece data, the comparison section 42 outputs to the display data generation section 44 a comparison result D indicating "strong". If it is determined that the level of the velocity" data of the performance data is smaller than the level of the "velocity" data dl of the music piece data, on the other hand, the comparison section 42 outputs to the display data generation section 44 a comparison result D indicating "weak". The display data generation section 44 generates a level indicating graphic corresponding to the comparison result D and outputs the thus-generated level indicating graphic to the user interface 12. In this manner, the comparison result D is displayed on the display 121. The display of the comparison result D is turned off, for example, in response to the instruction B of "intensity-display-off".

Details of Lesson Function

Figure 6:
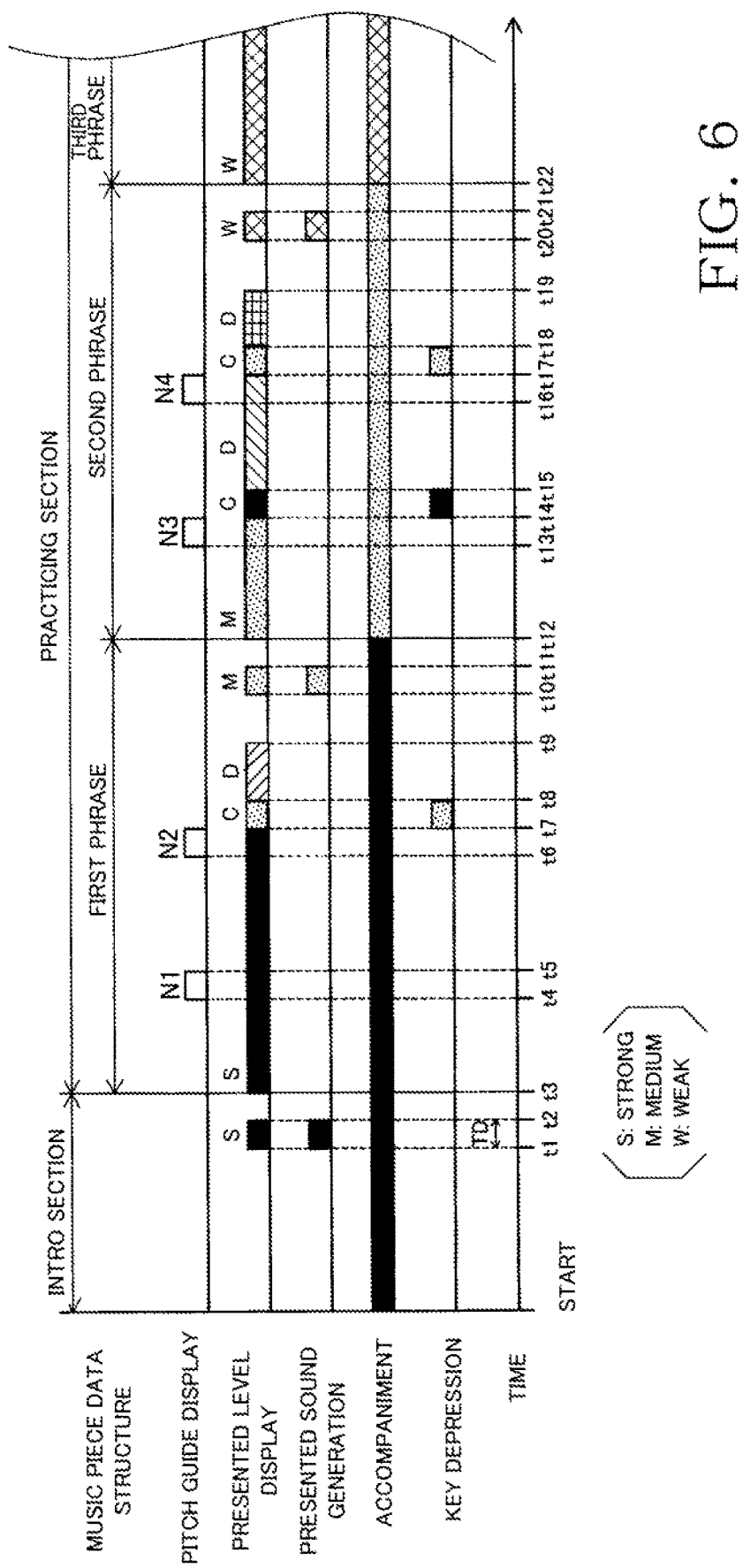
FIG. 6 is a time chart explanatory of a lesson function.

Next, details of the lesson function will be set forth below with reference to FIG. 6. In the horizontal row of "Pitch Guide Display" of FIG. 6, examples of the pitch guide display are illustrated along the time axis, and each time period when the pitch guide display is in the ON state is depicted by a rectangular graphic. In the horizontal row of "Presented Level Display" of FIG. 6, examples of the presented level display are illustrated along the time axis, each time period when the presented level display is in the ON state is depicted by a rectangular graphic, and differences among the target levels (strong, medium, and weak levels) in the presented level displays are distinguished by adding different hatchings in the rectangular graphics. Note that in the horizontal row of "Presented Level Display" of FIG. 6, a time period when a detected level corresponding to a key depression operation is being displayed is depicted by a particular rectangular graphic (C), and a time period when the above-mentioned comparison result is being displayed is depicted by another particular rectangular graphic (D). Further, in the horizontal row of "Presented Sound Generation" of FIG. 6, examples of the generation of presented sounds are illustrated along the time axis, and differences among volume levels (strong, medium, and weak) of the presented sounds to be generated are distinguished by adding different hatchings in the rectangular graphics. Furthermore, in the horizontal row of "Key Depression" of FIG. 6, examples of the user's key depression operation are illustrated along the time axis, and each time period when the user is executing a key depression operation is depicted by a rectangular graphic. The horizontal axis of FIG. 6 is the time axis, and a time point at which the human player depresses the "start/stop" key is set as a starting point of the time axis. FIG. 6 is a diagram for explaining sequences of displays and sound generation by the electronic keyboard musical instrument 1 just for descriptive convenience, and it should be appreciated that FIG. 6 is never intended to limit relative lengths of time periods, such as the ON time periods of the individual displays, to the illustrated examples; namely, the horizontal time axis of FIG. 6 never represents an uniform time scale.

Once the "start/stop" key is depressed, the electronic keyboard musical instrument 1 starts reproduction of an accompaniment of the intro section. In this case, for example, a velocity data value attached to the instruction G of "note-on" for the accompaniment sound of the intro section is set so that the volume of the accompaniment sound of the intro section is adjusted to a level same as an intensity level set for the model performance sounds in a first phrase. In the illustrated example, the volume of the accompaniment sound of the intro section is adjusted to the strong level because the intensity level for the model performance sounds in the first phrase is set to the strong level. In a latter half of the intro section, for example, at time t1 that is one beat before a start point of the first phrase, the electronic keyboard musical instrument 1 starts visual and audible presentations of a sound intensity for the first phrase of the model performance on the basis of the "note-on" instruction E for presented sound generation and "intensity-display-on" instruction B for presented level display read out by the readout section 41. In the illustrated example, because it is assumed that the sound intensity of the first phrase of the model performance is of the strong level, the electronic keyboard musical instrument 1 starts, at time t1, displaying the strong-level indicating graphic on the intensity indicator of the display 121 and generation of the strong-level presented sound via the sound system 15. Then, at time t2 when a predetermined time period TD has elapsed from time t1, the electronic keyboard musical instrument 1 ends the presented level display and the presented sound generation. Note that the presented sounds differ from one another in terms of the sound type depending on the intensity levels of the sounds. In the illustrated example, the strong level is represented by a cry (such as "ruff") of a dog, the medium level is represented by a cry (such as "mew") of a cat, the weak level is a cry (such as "peep") of a bird. In this manner, before entering in the first phrase of the practicing section, the human player can listen to the accompaniment sounds and the presented sounds, such as "ruff", corresponding to the intensity level (namely, one of the strong, medium, and weak levels) of the sounds in the first phrase. In addition, the human player can imagine the intensity level of the sounds in the first phrase by looking at the displayed indicating graphic.

At time t3, the music piece is controlled to shift from the intro section to the first phrase of the practicing section on the basis of information read out by the readout section 41. Following time t3, control is performed as follows in accordance with the progression of the performance time on the basis of information read out by the readout section 41. A performance (lesson music piece) sequentially instructed in the practicing section according to the key depression guide function (pitch guide display) will be referred to as "model performance". First, at time t3 when the first phrase starts, the electronic keyboard musical instrument 1 starts to display, on the basis of "intensity-display-on" instruction B for presented level display (i.e., intensity information indicative of the intensity of sounds in the first phrase) read out by the readout section 41, the level indicating graphic indicative of the strong level on the intensity indicator to indicate that the intensity of the sounds in the first phrase is the strong level. Thus, even after the performance has entered in the first phrase, the human player can visually confirm the intensity level of the sounds in the first phrase by the level indicating graphic. Further, as aforementioned, the volume of the accompaniment sounds for the first phrase is adjusted to the same level as the intensity level set for the model performance sounds of the first phrase. Next, at time t4, a pitch guide display indicating a pitch of a first sound N1 of the model performance is turned on (set in the ON state). Next, at time t5 when the predetermined time TD has elapsed from time t4, the pitch guide display indicating the pitch of the first sound N1 is turned off (set in the OFF state). Thus, after the human player has recognized an intensity of a key depression operation to be performed in the first phrase immediately before the start of the first phrase on the basis of the presented sound generation and the presented level display each performed for a time period from time t1 to time t2 prior to the timing to start the performance of the first phrase, by viewing the keyboard view (pitch guide display) while confirming the intensity of the sound of the key to be performed from the volume of the accompaniment sounds currently performed in the first phrase, the human player can know a sound generation timing at which a key is to be depressed and a pitch of the key to be depressed (i.e., the key of N1). Note that in the illustrated example of FIG. 6, the human player failed to depress the key to be depressed as the first sound N1. Because all of the time periods when the pitch guide display is set in the ON state are the same length of time (namely, the predetermined time period TD), the explanation about the ending of the pitch guide display will hereinafter be omitted to avoid unnecessary duplication.

For a time period between time t6 and time t7 following time t5, the electronic keyboard musical instrument 1 performs a pitch guide display indicating a pitch of a second sound N2 of the model performance. In this case too, in addition to recognition based on the presented sound generation and the presented level display each performed for the time period from time t1 to time t2 prior to the timing of starting the performance of the first phrase, by looking at the keyboard view (pitch guide display) while confirming the intensity of the sound of the key to be performed from the presented level display still performed in the first phrase too and the volume of the accompaniment sounds currently performed in the first phrase, the human player can know a sound generation timing at which a key is to be depressed and a pitch of the key to be depressed (i.e., the key of N2). In the illustrated example of FIG. 6, it is assumed that the human player executes a key depression operation with the medium level from time t7 to time t8. In this case, a detected level C indicative of the intensity (medium level) of the human player's key depression operation is generated by the performance data generation section 43 in response to the detection circuit 11 detecting this key depression operation, and the medium-level indicating graphic is displayed on the intensity indicator of the display 121 in accordance with the generated detected level C. Then, a comparison result D indicating that the detected medium level of the key depression operation is weaker than the strong level that is a current model key depression intensity is output from the comparison section 42. Display data for displaying a comparison result D is output to the user interface 12, and displaying a graphic corresponding to the comparison result D indicating "weak" is started at time t8 and continued until it is ended at time t9. In this manner, the human player can know that the intensity of the human player's depression is weaker than a model key depression intensity, namely, an intensity with which the key depression is supposed to be executed by the human player. Note that a time period from time t9 when the indicating graphic related to the phrase is ended to time t10 thereafter is set, for example, at a length of about one second as a time for breathing. As described below, at time t10, a sound generation and a display for presenting an intensity of sounds of a model performance for the next phrase are performed. Thus, the human player can easily visually recognize by the time for breathing that the target level changes.

Similarly to the aforementioned, in a latter half of the first phrase, for example, at time t10 which precedes a start point of a second phrase by one beat time, the electronic keyboard musical instrument 1 starts visual and audible presentations of a sound intensity for the second phrase of the model performance on the basis of the "note-on" instruction E for presented sound generation and "intensity-display-on" instruction B for presented level display read out by the readout section 41. In the illustrated example, because it is assumed that the sound intensity of the second phrase of the model performance is of the medium level, the electronic keyboard musical instrument 1 starts, at time t10, displaying the medium-level indicating graphic on the intensity indicator of the display 121 and generation of the medium-level presented sound via the sound system 15. Then, at time t11 when the predetermined time period TD has elapsed from time t10, the electronic keyboard musical instrument 1 ends the presented level display and the presented sound generation.

Next, at time t12, the music piece is controlled to shift from the first phrase to the second phrase. Similarly to the aforementioned, at time t12 when the second phrase starts, the electronic keyboard musical instrument 1 starts to display, on the basis of "intensity-display-on" instruction B for presented level display (i.e., intensity information indicative of the intensity of sounds in the second phrase) read out by the readout section 41, the medium-level indicating graphic indicative of the intensity of the sounds in the second phrase on the intensity indicator. Thus, even after the performance has entered the second phrase, the human player can visually confirm the intensity level of the sounds in the second phrase. Further, as aforementioned, the volume of the accompaniment sounds for the second phrase is adjusted to the medium level same as the intensity level set for the model performance sounds of the second phrase. Next, for a time period from time t13 to time t14, a pitch guide display indicating a pitch of a third sound N3 of the model performance is performed. In the illustrated example, it is assumed that the humane player executes a key depression operation with the strong level from time t14 to time t15. In this case, the strong-level indicating graphic is displayed on the intensity indicator in accordance with the detected level C. Then, a comparison result D indicating that the detected strong level of the key depression operation is stronger than the medium level that is a current model key depression intensity is output from the comparison section 42. Display data for displaying a comparison result D is output to the user interface 12, and displaying a graphic corresponding to the comparison result D indicating "strong" on the intensity indicator is started at time t15.

For a time period between time t16 and time t17 following time t15, the electronic keyboard musical instrument 1 performs a pitch guide display indicating a pitch of a fourth sound N4 of the model performance. In this case too, in addition to recognition based on the presented sound generation and the presented level display each performed for the time period from time t10 to time t11 prior to the timing of starting the performance of the second phrase, by looking at the keyboard view (pitch guide display) while confirming the intensity of the sound of the key to be performed from the presented level display still performed in the second phrase too and the volume of the accompaniment sounds currently performed in the second phrase, the human player can know a sound generation timing at which a key is to be depressed and a pitch of the key to be depressed (i.e., the key of N4). In the illustrated example of FIG. 6, it is assumed that the human player executes a key depression operation with the medium level from time t17 to time t18. In this case, the indicating graphic to be displayed on the intensity indicator is changed to the medium-level indicating graphic in accordance with the detected level C. Then, a comparison result D indicating that the detected medium level of the key depression operation coincides with the medium level that is a current model key depression intensity is output from the comparison section 42 (i.e., "right"). Display data for displaying a comparison result D is output to the user interface 12, and displaying a graphic corresponding to the comparison result D indicating "right" is started at time t18 and continued until it is ended at time t19.

Similarly to the aforementioned, in a latter half of the second phrase, for example, at time t20 which precedes a start point of a third phrase by one beat time, the electronic keyboard musical instrument 1 starts visual and audible presentations of a sound intensity for the third phrase of the model performance on the basis of the "note-on" instruction E for presented sound generation and "intensity-display-on" instruction B for presented level display read out by the readout section 41. In the illustrated example, because it is assumed that the sound intensity of the third phrase of the model performance is of the weak level, the electronic keyboard musical instrument 1 starts, at time t20, displaying the weak-level indicating graphic on the intensity indicator of the display 121 and generation of the weak-level presented sound via the sound system 15. Then, at time t21 when the predetermined time period TD has elapsed from time t20, the electronic keyboard musical instrument 1 ends the presented level display and the presented sound generation. Next, at time t22, the music piece is controlled to shift from the second phrase to the third phrase, and the volume of the accompaniment sounds is changed from the medium level to the weak level. Further, displaying a weak-level indicating graphic on the intensity indicator is started. Then, once the readout section 41 reads out the end code of the performance data, or once the start/stop key is depressed, the electronic keyboard musical instrument 1 ends the reproduction of the music piece data.

Next, an additional description will be given of the music piece data and functional block. For example, on the lesson track(s) of the music piece data having content illustrated in FIG. 6, "intensity-display-on", "note-on", "note-off", "keyboard-display-on", "keyboard-display-off", "keyboard-display-on", "keyboard-display-off", and "intensity-display-off" are sequentially arranged as events of portions of the practicing section corresponding to time t3 to time t9. When a plurality of "note-on" events are input as performance data F of the keyboard 10, the sound generator circuit 13 outputs digital audio signals corresponding to the plurality of "note-on" events, and thus, a plurality of sounds corresponding to the performance data F are generated from the sound system 15. When instructions of "intensity-display-on" and "intensity-display-off" that are instructions relating to the display on the intensity indicator, performance data, and a comparison result D are input to the display data generation section 44, the display data generation section 44 processes these instructions and data on a last-come first-served basis. Once performance data is input to the display data generation section 44 at time t7, for example, the display data generation section 44 switches the display on the intensity indicator from the display of the target level (presented level display B) to the display of the detected level C. Further, once the comparison result D is input to the display data generation section 44 at time t8, the display data generation section 44 switches the display to the display of the comparison result D. Furthermore, once the instruction B of "intensity-display-off" is input to the display data generation section 44 at time t9, the display data generation section 44 turns off the display on the intensity indicator irrespective of whether the displayed content on the intensity indicator is the detected level C, comparison result D, or target level (presented level display B). Further, the respective values of "velocity" recorded on the accompaniment track(s) are previously configured so as to correspond to the values of "velocity" of "intensity-display-on" recorded on the lesson track(s). Thus, the electronic keyboard musical instrument 1 can automatically adjust the volume of the accompaniment sounds in corresponding relation to the intensity levels of sounds of the model performance in the respective phrases.

In the above-described embodiment, the "keyboard-display-on" and "keyboard-display-off" events (instructions A) and the time information corresponding to these "keyboard-display-on" and "keyboard-display-off" events correspond to performance information that designates a sound generation timing and sound for each sound of the model performance. Further, the "intensity-display-on" and "intensity-display-off" events for presented level display and the "velocity" data attached to such events such events (instructions B), and the "note-on" and "note-off" events for presented sound generation (instructions E) correspond to intensity information that indicates a sound intensity for one of the plurality of phrases into which the model performance is divided. Thus, the data storage section 20 (RAM 18) is an example of a supply means or section (namely, the database) that, for each sound of the model performance, supplies performance information that designates a sound generation timing and sound, and supplies, for each of the plurality of phrases into which the model performance is divided, intensity information indicative of an intensity of sound for the phrase. Further, the aforementioned construction where the readout section 41 sequentially reads out, from the data storage section 20 (RAM 18), the instructions, specified by the individual events, at timings according to the time information is an example of a means or section that progresses the performance time. Furthermore, the time information corresponding to the "intensity-display-on" event for presented level display and the time information corresponding to the "note-on" event for presented sound generation are set to precede, for each phrase, by the above-mentioned predetermined preceding time (such as the time corresponding to one beat at the normal performance tempo), a start time of the phrase of the model performance corresponding to the intensity-display-on and note-on events. Thus, a display start timing of the presented level display B to be displayed on the user interface 12 via the display data generation section 44 on the basis of read-out output from the readout section 41 and a generation start timing of the presented sound E to be generated from the sound system 15 via the sound generator circuit 13 are controlled to precede, by the above-mentioned predetermined preceding time, the start time of the phrase corresponding to the display start timing of the presented level display B and generation start timing of the presented sound E (sound generation timing). Thus, the aforementioned construction where the presented sound level display B is executed and the presented sound E is generated ahead of the start time of the phrase through cooperation among the readout section 41, display data generation section 44, user interface 12, sound generator circuit 13, and sound system 15 is an example of a presentation means or section that, in accordance with the progression of the performance time and for each phrase of the model performance, acquires the intensity information ahead of a start timing when a performance of the phrase is to be started and presents the intensity of sound common to sounds in the phrase based on the acquired intensity information. Furthermore, the aforementioned construction where the key depression guide is executed by the display data generation section 44 via the user interface 12 on the basis of the readout output (the instructions A of "keyboard-display-on" and "keyboard-display-off") from the readout section 41 is an example of a performance guide means or section that guides the user about each sound to be performed by the user in accordance with the progression of the performance time on the basis of the performance information of each sound of the model performance.

The above-described embodiments achieve the following advantageous effects. Before a start timing of a phrase to be performed next, the human player can know a presented intensity of a sound, for which a key is to be depressed, through a presented level display on the intensity indicator and generation of a presented sound, and thus, the human player can practice a key depression operation while being aware of (or while having in mind) the intensity of the sound for which the key is to be depressed. Further, because the volume of the accompaniment sounds for each phrase is adjusted to a target level for the phrase, the human player can practice a performance while being aware of (or while having in mind) an intensity of a performance operation by listening to the volume of the accompaniment performance at the same time of the performance operation. In addition, because a comparison result is displayed on the intensity indicator, the human player can know a result of the performance executed by the human player.

Modifications

It should be appreciated that the present invention is not limited to the above-described embodiments and various improvements and modifications of the present invention are of course possible without departing from the basic principles of the present invention. For example, whereas the music piece data has been described above as including the intro section and the practicing section, the music piece data may include only the practicing section without including the intro section. In such a case, the electronic keyboard musical instrument 1 may include an inserted data generation section. For example, the inserted data generation section is constructed in such a manner that, prior to the start of a performance progression of the practicing section, the inserted data generation section presents to the human player (user), by way of samples, ways of presenting a sound intensity (namely, a way of generating a presented sound and a way of displaying a presented level) for each of a plurality of predetermined stages of intensity levels (strong, medium, and weak levels). In such a case, information indicative of examples or samples of all of the intensity levels used on the lesson track may be included in the music piece information (header information) of the music piece data. For example, in a case where values of all of three stages of intensity levels corresponding to small, medium, and strong levels are used as "velocity" values in the data of the practicing section stored on the lesson track(s), sample information of all of the small, medium, and strong levels may be included as sample information of the intensity levels to be included in the music piece information (header information). Before the readout section 41 starts reading out the practicing section, the inserted data generation section sequentially outputs to the display data generation section 44 instructions of "intensity-display-on" and "intensity-display-off" of each of the small, medium, and strong levels on the basis of the sample information of the intensity levels included in the music piece information (header information), but also sequentially outputs instructions of "note-on" and "note-off" to the sound generator circuit 13. With such arrangements, display of the presented levels of the small, medium, and strong levels and generation of the presented sounds as presentation samples are executed before the reproduction of the practicing section. Such arrangements enable generation of the presented sounds and display of the presented levels to be executed before the reproduction of the practicing section, even in the case where the music piece data does not include the intro section.

Further, although in the above-described embodiments, "intensity-display-on" and "intensity-display-off" events for presented level display (namely, presented-level displaying "intensity-display-on" and "intensity-display-off" events) and/or "note-on" and "note-off" events for presented sound generation (namely, presented-sound generating "note-on" and "note-off" events) are included (stored) in advance in the music piece data, arrangements may be made such that the presented-level displaying events and presented-sound generating events are not included (stored) in advance in the music piece data. In such a case, in the process of sequentially reading out performance guiding "keyboard-display-on" event in accordance with the progression of the performance time, the readout section 41 may determine a timing that precedes, by the above-mentioned predetermined preceding time (such as the time corresponding to one beat at the normal performance tempo), a start timing of a next phrase, and may then generate and output, at the thus-determined timing, an instruction B of "intensity-display-on" for presented level display and an instruction E of "note-on" for presented sound generation. In such a case, the readout section 41 only has to pre-read "velocity" data attached to a "keyboard-display-on" event at the front of the next phrase and generate, on the basis of the pre-read "velocity" data, "velocity data" (intensity information) to be attached to the generated instruction B of "note-on" for presented level display and the instruction E of "note-on" for presented sound generation. Needless to say, it is assumed here that at least each "keyboard-display-on" event at the front of each phrase is accompanied by "velocity" data indicative of an intensity with which a keyboard key is to be depressed in accordance with the "keyboard-display-on" event. In this case, let it be also assumed that the instruction B of "intensity-display-off" corresponding to the instruction B of "intensity-display-on" and the instruction E of "note-off" corresponding to the instruction E of "note-on" generated and output as above are each automatically generated and output by the readout section after a lapse of a predetermined time.

In the above-described embodiments, presented-level displaying "intensity-display-on" events and/or presented-sound generating "note-on" events are included (stored) in advance in the music piece data, as noted above. However, as another modification, such presented-level displaying events and/or presented-sound generating events may be arranged (stored) at same time positions as performance guiding "keyboard-display-on" events at the front of the respective phrases corresponding to the presented-level displaying and/or presented-sound generating events, without dedicated time information corresponding to the presented-level displaying and/or presented-sound generating events being included (stored) in advance. Namely, in such a case, the presented-level displaying "intensity-display-on" events and/or presented-sound generating "note-on" events use or share the same time information corresponding to the performance guiding "keyboard-display-on" events that are arranged (stored) at the same time positions as the presented-level displaying "intensity-display-on" events and/or presented-sound generating "note-on" events. In such a case, in the process of sequentially reading out performance guiding "keyboard-display-on" and "keyboard-display-off" events in accordance with the progression of the performance time, the readout section 41 may determine a timing that precedes, by the above-mentioned predetermined preceding time (such as a time corresponding to one beat at the normal performance tempo), a start timing of a next phrase, and may then pre-read, at the thus-determined timing, the instruction B of presented-level displaying "intensity-display-on" and the instruction E of presented-sound generating "note-on" that are arranged (stored) at the same time position as the "keyboard-display-on" event at the front of the phrase. Because intensity information indicative of a sound intensity is included in each presented-level displaying "intensity-display-on" event and each presented-sound generating "note-on" event that are included (stored) in the practicing section as noted above, the pre-read instruction B of presented-level displaying "intensity-display-on" and instruction E of presented-sound generating "note-on" include intensity information indicative of a sound intensity. In this case too, the instruction B of "intensity-display-off" corresponding to the instruction B of "intensity-display-on" and the instruction E of "note-off" corresponding to the instruction E of "note-on" may each be automatically generated and output after a lapse of a predetermined time.

Although the embodiments of the present invention have been described above in relation to the case where the value of the respective values of "velocity" recorded on the accompaniment track(s) are previously configured so as to correspond to the values of "velocity" of "intensity-display-on" recorded on the lesson track(s), it is not so limited. For example, a "phrase mark" indicative of a change of a phrase may be inserted in (recorded on) the accompaniment track(s) or the lesson track(s) as an event. The same "velocity" as the "intensity-display-on" of the same phrase may be attached to the "phrase mark". Upon reading out the "phrase mark", the readout section 41 instructs the sound system 15 to generate a sound with a volume corresponding to the "velocity" attached to the read-out "phrase mark".

Further, although the embodiments of the present invention have been described above in relation to the case where the presented level display is continuously displayed in one phrase, it is not so limited. For example, the presented level display may be intermittently displayed before the pitch guide display, etc.

Furthermore, although cries of animals have been illustrated above as the presented sounds, the presented sounds may be sounds of musical instruments, such as a cymbal, drum, whistle and piano. In such a case, he presented sounds may be chord sounds.

Furthermore, although the pitch guide display in the embodiments of the present invention has been described as clearly indicating a pitch by use of the keyboard view, the embodiments of the present invention are not so limited. Because the lesson function employed in the embodiments is designed for sound intensity lesson, pictures that do not clearly indicate pitches, such as circular marks that are unaccompanied by a keyboard view, may be displayed. Moreover, the embodiments of the present invention do not necessarily have to have the key depression guide function (pitch guide display).

Furthermore, although the embodiments of the present invention have been described above in relation to the case where the time length over which the presented level display is kept in the OFF state when the target level is to be changed is about one second, the embodiments are not so limited. For example, the time length over which the presented level display is kept in the OFF state may be changed in accordance with a reproduction tempo of the music piece data. As an example, when the tempo is slow, the time length over which the presented level display is kept in the OFF state may be set at a time length corresponding to, for example, a phonetic value of a quarter note or half note. Note that the reproduction tempo may be set at a tempo value included in the music piece data or may be set at a tempo set by the human player via the user interface 12 of the electronic keyboard musical instrument 1.

Moreover, although the embodiments of the present invention have been described above in relation to the case where the presented level display is turned off temporarily when the target level is to be changed, the embodiments are not so limited. For example, the latest presented level display may be maintained in the ON state until the target level is changed, in such a manner that the level indicating graphic can be switched to another with no interruption. In such a case, each "intensity-display-off" event located ahead an "intensity-display-on" event in the music piece data may be omitted, because the display data generation section 44 processes input signals on a last-come first-served basis.

Furthermore, although the embodiments of the present invention have been described above in relation to the case where the pitch guide display is executed once in response to a presented sound being generated once, the number of times the pitch guide display is executed is not so limited. For example, the pitch guide display may be executed a plurality of times after a presented sound is generated one or a plurality of times, or the pitch guide display may be executed one or a plurality of times after a presented sound is generated a plurality of times.

Moreover, although the embodiments of the present invention have been described above as presenting the presented sound generation and presented level display at three stages, the present invention is not so limited, and the presented sound generation and presented level display may be presented at two stages, namely, strong and weak, or at four or more stages.

Furthermore, although the embodiments of the present invention have been described above as classifying "velocity" values into the value ranges of 1 to 42, 43 to 84, and 85 to 127, the present invention is not so limited. For example, arrangements may be made so as to enable the human player to freely set velocity value ranges, for example, by operating the user interface 12. Velocity value ranges differing among different music piece data (sets) or among genres of music pieces may be set.

Furthermore, the length of the predetermined preceding time set for presenting a presented level and/or a presented sound ahead of a corresponding sound generation timing (pitch guide display) is not limited to the time length corresponding to one beat and may be a time length shorter than one beat. However, the predetermined preceding time set at the length corresponding to one beat is preferable in that such a preceding time matches a tempo count feeling of the human player and thus facilitates the human player to mentally prepare for executing a key depression operation with a presented sound intensity.

Furthermore, the displayed content on the intensity indicator is not limited to those employed in the above-described embodiments of the present invention. Although the embodiments have been described above in relation to the case where the target level (presented level display), detected level, and comparison result are displayed in a sequentially switching manner, one at a time, all or any two of these may be displayed simultaneously. Furthermore, the level indicating graphics are not limited to those employed in the above-described embodiments of the present invention. For example, the target levels may be displayed in letters or characters, such as "strong", "medium", and "weak", or may be displayed in different colors depending on the levels. Moreover, the aforementioned levels may be displayed in different forms depending on types of displays; for example, the target level (presented level) may be displayed with no blinking or flickering, and the detected level may be displayed with blinking or flickering.

Moreover, although the embodiments of the present invention have been described above as displaying a comparison result, the embodiments are not so limited. For example, an evaluation result, such as "good" or "bad" or evaluation score, may be displayed. In such a case, other items, such as a pitch and/or operation timing of a key depression operation, may be evaluated in addition to a "velocity" (sound intensity) of the key depression operation.

Furthermore, although the embodiments of the present invention have been described above as implementing the readout section 41, comparison section 42, performance data generation section 43, and display data generation section 44, for example, by the CPU 16 (general-purpose processor) executing a program (processing or tasks), the embodiments are not so limited. Such a readout section 41, comparison section 42, performance data generation section 43, and display data generation section 44 may be implemented by dedicated circuits or a combination of dedicated circuits and processing executed by the CPU 16.

Furthermore, although the embodiments of the present invention have been described above in relation to the case where the music piece data (set) is stored in the data storage section 20, the embodiments are not so limited. Music piece data may be downloaded from a server via the network interface 21. Moreover, the electronic keyboard musical instrument 1 is not limited to the above-described construction or configuration and may be constructed or configured to include an interface that transmits and receives (communicates) data to and from a storage medium, such as a USB memory, storing music piece data. Furthermore, although the network interface 21 has been described above as executing LAN communication, the embodiments of the present invention are not so limited, and the network interface 21 may be configured to execute communication conforming to any of other standards, such as MIDI, USB, and Bluetooth (registered trademark) standards. In such a case, the processing may be executed by use of music piece data stored in other equipment, such as a PC or other communication device, connected to a network, or music piece data transmitted from a remote location.

Furthermore, although the music piece data (set) used in the embodiments of the present invention has been described as being of the MIDI format, such music piece data may be, for example, audio data. In such a case, the audio data may be converted into MIDI data so that the processing can be executed by use of the converted MIDI data. Moreover, although the music piece data used in the embodiments of the present invention has been described as having a plurality of tracks, the embodiments are not so limited, and the music piece data may have only one track.

Furthermore, although the electronic keyboard musical instrument 1 has been described above as including the timer 31, the timer function may be implemented by the CPU 16 executing a program.

Furthermore, although the embodiments of the present invention have been described above in relation to the electronic keyboard musical instrument 1 including the keyboard 10 as its performance operator or operation unit, the embodiments are not so limited and can be applied to various other forms of musical instruments or electronic musical instruments where a sound is generated by a blowing operation or by flicking of a string or stick-shaped operator. The embodiments of the present invention may further include a sensor for detecting a moving velocity of a performance operator and may be constructed to display an intensity level of a performance operation in accordance with a detection signal output from the sensor. The embodiments of the present invention may also be constructed to detect volume of a performance sound, for example, by a microphone or the like and display the detected volume as an intensity level.

In the aforementioned embodiments, a main construction for realizing the inventive performance training apparatus and/or method is accomplished by CPU 16 (namely, a processor) executing necessary computer program or steps of various processing. Namely, according to one aspect of the aforementioned embodiments, the inventive performance training apparatus includes: a memory device (data storage section 20, RAM 18) that, for each sound of a model performance, supplies performance information designating a sound generation timing and sound, and supplies, for each of a plurality of phrases into which the model performance is divided, intensity information indicative of an intensity of sound for the phrase; an output device (user interface 12, sound generator circuit 13, sound system 15); and a processor (CPU 16). The processor (CPU 16) is configured to: progress a performance time (i.e., a program or task for realizing the function of the readout section 41); and in accordance with a progression of the performance time and for each phrase of the model performance, acquire the intensity information ahead of a start timing when a performance of the phrase is to be started and present the intensity of sound common to sounds in the phrase based on the acquired intensity information (i.e., programs or tasks for realizing the functions of the readout section 41 and the display data generation section 44).

According to another aspect of the aforementioned embodiment, the performance training apparatus includes a supply section (namely, the aforementioned database) that, for each sound of a model performance, supplies performance information designating a sound generation timing and sound, and supplies, for each of a plurality of phrases into which the model performance is divided, intensity information indicative of an intensity of sound for the phrase; a section that progresses a performance time; and a presentation section that, in accordance with a progression of the performance time and for each phrase of the model performance, acquires the intensity information ahead of a start timing when a performance of the phrase is to be started and presents the intensity of sound common to sounds in the phrase based on the acquired intensity information.

According to further aspect of the aforementioned embodiment, the presentation section may be configured to present the intensity of sound for the phrase at least in a visual or audible manner. Further, the presentation section may be configured in such a manner that in a case where the intensity of sound for the phrase is to be presented in the visual manner, the intensity of sound for the phrase is visually presented not only at a timing ahead of the performance of the phrase but also at a timing during the performance of the phrase. With this arrangement, it is possible for the performance player to easily visually recognize a presentation indicative of the intensity of sound for the phrase.

According to furthermore aspect of the aforementioned embodiment, the inventive performance training apparatus may further include a reproduction section that reproduces an accompaniment performance associated with the model performance; and an adjustment means that, when the accompaniment performance for each phrase is to be performed, adjusts an intensity of a sound of the accompaniment performance reproduced by the reproduction section based on the intensity information acquired for the phrase. With such arrangements, it is possible for the performance player to easily recognize an intensity of performance operation for a current phrase based on the volume of the accompaniment performance being currently reproduced during the phrase, and whereby the human player can efficiently do a performance practice with an awareness of the intensity of sound for each phrase.

According to further aspect of the aforementioned embodiment, the inventive performance training apparatus may further include a section that, in response to a performance operation executed by the user in accordance with the progression of the performance time, acquires user's performance information indicative of a sound performed by the user, the user's performance information including information indicative of an intensity of the sound. Further, when a performance for each phrase is to be performed, the presentation section may present information indicative of a difference between the intensity of sound for the phrase and the intensity of the sound in the user's performance on the basis of a comparison between the intensity information for the phrase and the information indicative of the intensity of the sound included in the user's performance information. Such arrangements can facilitate a comparison between an intensity of sound for each phrase in the model performance and an intensity of a corresponding sound in the user's performance and thereby achieves enhanced performance training quality.

The foregoing disclosure has been set forth merely to illustrate the embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A performance training apparatus comprising:
    a database that, for each sound of a model performance, supplies performance information designating a sound generation timing and sound, and supplies, for each of a plurality of phrases into which the model performance is divided, intensity information indicative of an intensity of sound for the phrase;
    an output device;
    a storage medium storing a program; and
    a processor for executing the program, the processor, when executing the program, configured to:
    progress a performance time;
    in accordance with a progression of the performance time and for each phrase of the model performance, acquire the intensity information ahead of a start timing at which a performance of the phrase is to be started and present, via the output device for a given time length preceding the start timing, an intensity of sound that is to be applied in common to sounds in the phrase based on the acquired intensity information;
    reproduce an accompaniment performance associated with the model performance; and
    when the accompaniment performance is to be reproduced for each of the phrases, adjust, based on the intensity information acquired for the phrase, an intensity of a sound of the reproduced accompaniment performance.

2. The performance training apparatus as claimed in claim 1, wherein the processor is further configured to:
    in response to a performance operation executed by a user in accordance with the progression of the performance time, acquire user's performance information indicative of a sound performed by the user, the user's performance information including information indicative of an intensity of the sound; and
    present, via the output device, the intensity of the sound performed by the user based on the user's performance information.

3. The performance training apparatus as claimed in claim 2, wherein the processor is further configured to, when the performance operation is to be executed for each of the phrases, present, based on a comparison between the intensity information for the phrase and the information indicative of the intensity of the sound included in the user's performance information, information indicative of a difference between the intensity of sound for the phrase and the intensity of the sound in the user's performance.

4. The performance training apparatus as claimed in claim 1, wherein the processor is configured to present the intensity of sound for the phrase at least in a visual or audible manner via the output device.

5. The performance training apparatus as claimed in claim 4, wherein the processor is configured in such a manner that in a case where the intensity of sound for the phrase is to be presented in the visual manner, the intensity of sound for the phrase is visually presented not only at a timing ahead of the performance of the phrase but also at a timing corresponding to the performance of the phrase.

6. The performance training apparatus as claimed in claim 1, further comprising a performance guide device that, based on the performance information of each sound of the model performance and in accordance with the progression of the performance time, guides the user about a sound to be performed by the user.

7. The performance training apparatus as claimed in claim 1, wherein the database includes a local memory storing the performance information for each sound of the model performance corresponding to a music piece for which the user is to be trained and the intensity information indicative of the intensity of sound for each of the phrases.

8. A computer-implemented performance training method which utilizes an output device, a storage medium storing a program, and a processor for executing the program, the method comprising:
    storing in a database, for each sound of a model performance, performance information designating a sound generation timing and sound, and for each of a plurality of phrases into which the model performance is divided, intensity information indicative of an intensity of sound for the phrase;
    for each sound of the model performance, acquiring, by the processor, the performance information designating the sound generation timing and sound from the database;
    for each of the plurality of phrases into which the model performance is divided, acquiring, by the processor, the intensity information indicative of the intensity of sound for the phrase from the database;
    progressing, by the processor, a performance time;
    in accordance with a progression of the performance time and for each phrase of the model performance, acquiring, by the processor, the intensity information ahead of a start timing at which a performance of the phrase is to be started and presenting, via the output device for a given time length preceding the start timing, an intensity of sound that is to be applied in common to sounds in the phrase based on the acquired intensity information;
    reproducing, by the processor, an accompaniment performance associated with the model performance; and
    when the accompaniment performance is to be reproduced for each of the phrases, adjusting, by the processor, based on the intensity information acquired for the phrase, an intensity of a sound of the reproduced accompaniment performance.

9. The performance training method as claimed in claim 8, further comprising:
    in response to a performance operation executed by a user in accordance with the progression of the performance time, acquiring user's performance information indicative of a sound performed by the user, the user's performance information including information indicative of an intensity of the sound; and
    presenting, via the output device, the intensity of the sound performed by the user based on the user's performance information.

10. The performance training method as claimed in claim 9, further comprising:

when the performance operation is to be executed for each of the phrases, presenting, based on a comparison between the intensity information for the phrase and the information indicative of the intensity of the sound included in the user's performance information, information indicative of a difference between the intensity of sound for the phrase and the intensity of the sound in the user's performance.

11. The performance training method as claimed in claim 8, wherein the intensity of sound for the phrase is presented at least in a visual or audible manner via the output device.

12. The performance training method as claimed in claim 11, wherein, in a case where the intensity of sound for the phrase is to be presented in the visual manner, the intensity of sound for the phrase is visually presented not only at a timing ahead of the performance of the phrase but also at a timing corresponding to the performance of the phrase.

13. The performance training method as claimed in claim 8, further comprising:

activating a performance guide device that, based on the performance information of each sound of the model performance and in accordance with the progression of the performance time, guides the user about a sound to be performed by the user.

14. A computer-readable, non-transitory storage medium storing a program executable by one or more processors to perform a performance training method, the performance training method comprising:

for each sound of a model performance, acquiring performance information designating a sound generation timing and sound from a database;

for each of a plurality of phrases into which the model performance is divided, acquiring intensity information indicative of an intensity of sound for the phrase from the database;

progressing a performance time;

in accordance with a progression of the performance time and for each phrase of the model performance, acquiring the intensity information ahead of a start timing at which a performance of the phrase is to be started and presenting, via the output device for a given time length preceding the start timing, an intensity of sound that is to be applied in common to sounds in the phrase based on the acquired intensity information;

reproducing an accompaniment performance associated with the model performance; and when the accompaniment performance is to be reproduced for each of the phrases, adjusting, based on the intensity information acquired for the phrase, an intensity of a sound of the reproduced accompaniment performance.

* * * * *